(12) United States Patent
Chujoh et al.

(10) Patent No.: US 7,599,437 B2
(45) Date of Patent: Oct. 6, 2009

(54) VIDEO ENCODING/DECODING METHOD AND APPARATUS

(75) Inventors: Takeshi Chujoh, Tokyo (JP); Shinichiro Koto, Tokyo (JP); Yoshihiro Kikuchi, Tokyo (JP); Akiyuki Tanizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 16 days.

(21) Appl. No.: 11/685,565

(22) Filed: Mar. 13, 2007

(65) Prior Publication Data

US 2007/0153901 A1 Jul. 5, 2007

Related U.S. Application Data

(60) Division of application No. 10/896,890, filed on Jul. 23, 2004, which is a continuation of application No. PCT/JP03/14658, filed on Nov. 18, 2003.

(30) Foreign Application Priority Data

Nov. 22, 2002 (JP) ............................. 2002-339931

(51) Int. Cl.
*H04B 1/66* (2006.01)
*H04N 7/12* (2006.01)

(52) U.S. Cl. ................................. 375/240.16

(58) Field of Classification Search ............ 375/240.01, 375/240.12, 240.13, 240.16, 240.17, 240.19, 375/240.2; *H04B 1/66; H04N 7/12*
See application file for complete search history.

(56) References Cited

U.S. PATENT DOCUMENTS 5,400,087 A 3/1995 Uramoto et al.
(Continued)

FOREIGN PATENT DOCUMENTS

JP 2-192378 7/1990
(Continued)

OTHER PUBLICATIONS

Yoshihiro Kikuchi, et al., "Multi-frame interpolative prediction with modified syntax", Toshiba Corporation/ Matsushita Electric Industrial Co., Ltd., http://ftp3.itu.ch/av.arch/jvt-site/2002_05_Fairfaix/JVT-C066.doc, JVT-C066, Jan. 5, 2002, pp. 1-13.
(Continued)

*Primary Examiner*—Tung Vo
(74) *Attorney, Agent, or Firm*—Oblon, Spivak, McClelland, Maier & Neustadt, L.L.P.

(57) ABSTRACT

A video encoding apparatus comprises a frame memory/predictive image generator having a first predictive mode for generating a predictive image signal by selecting a combination from among a plurality combinations of a reference image number and a plurality of predictive parameters, and a second predictive mode for generating a predictive image signal according to a predictive parameter computed based on reference image numbers of reference images and an image-to-image distance, and a variable-length encoder to select one of the first and second prediction modes by the number of reference images, and encode orthogonal transformation coefficient information concerning a predictive error signal of a predictive image signal with respect to input video signal, mode information indicating an encoding mode, motion vector information and combination of selected reference image number with predictive parameter index information indicating combination of selected reference image information.

2 Claims, 7 Drawing Sheets

U.S. PATENT DOCUMENTS

| | | | |
|---|---|---|---|
| 5,903,313 A * | 5/1999 | Tucker et al. | 375/240.15 |
| 6,081,551 A * | 6/2000 | Etoh | 375/240 |
| 6,266,370 B1 | 7/2001 | Kamikura et al. | |
| 6,411,651 B1 * | 6/2002 | Rose et al. | 375/240.13 |
| 6,456,658 B2 | 9/2002 | Kamikura et al. | |
| 6,459,733 B1 | 10/2002 | Yokoyama et al. | |
| 7,116,372 B2 * | 10/2006 | Kondo et al. | 348/448 |
| 7,242,716 B2 * | 7/2007 | Koto et al. | 375/240.16 |
| 7,376,186 B2 * | 5/2008 | Boyce et al. | 375/240.15 |
| 2001/0016005 A1 | 8/2001 | Kamikura et al. | |
| 2003/0215014 A1 * | 11/2003 | Koto et al. | 375/240.16 |

FOREIGN PATENT DOCUMENTS

| | | |
|---|---|---|
| JP | 9-163376 | 6/1997 |
| JP | 10-136385 | 5/1998 |
| JP | 10-224795 | 8/1998 |
| JP | 2938412 | 6/1999 |
| JP | 11-239351 | 8/1999 |
| JP | 3166716 | 3/2001 |
| KR | 1998-066600 | 10/1998 |
| KR | 0172902 | 3/1999 |

OTHER PUBLICATIONS

Thomas Wiegand, et al., "Multi-Frame Motion-Compensated Prediction for Video Transmission", Kluwer Academic Publishers, 2001, pp. 36-59.

"Editor's Proposed Draft Text Modifications for Joint Video Specification" (ITU-T Rec. H.264 | ISO/IEC 14496-10 AVC), Geneva modifications draft 37, Joint Video Team (JVT) of ISO/IEC MPEG and ITU-T VCEG, Oct. 9-17, 2002, pp. i-xxiii and 105-107.

Miska M. Hannuksola, Generalized B/MH-Picture Averaging, Joint Video Tem (JVT) of ISO/IEC MPEG & ITU-T VCEG (ISO/IEC JTC1/SC29/WG11 and ITU-T SG16 Q. 6) $3^{rd}$ Meeting: Fairfax, Virginia, USA; May 6-10, 2002, pp. 1-5.

Jill Boyce, Changes to Adaptive Reference Picture Weighting, Joint Video Team (JVT) of ISO/IEC MPEG & ITU-T VCEG (ISO/IEC JTC1/SC29/WG11 and ITU-T SG16 Q.6); $5^{th}$ Meeting Geneva, CH, Oct. 9-17, 2002, pp. 1-4.

* cited by examiner

| Index i | Reference image number | Luminance signal | | | Color difference signal | | | | |
|---|---|---|---|---|---|---|---|---|---|
| | | Flag | Predictive parameter Y | | Flag | Predictive parameter Cb | | Predictive parameter Cr | |
| | | | D1 | D2 | | E1 | E2 | F1 | F2 |
| 0 | 105 | 1 | 13 | 30 | 1 | 7 | 10 | 8 | 5 |
| 1 | 105 | 0 | | | 0 | | | | |
| 2 | 104 | 1 | 3 | 50 | 0 | | | | |
| 3 | 103 | 1 | 5 | 46 | 0 | | | | |

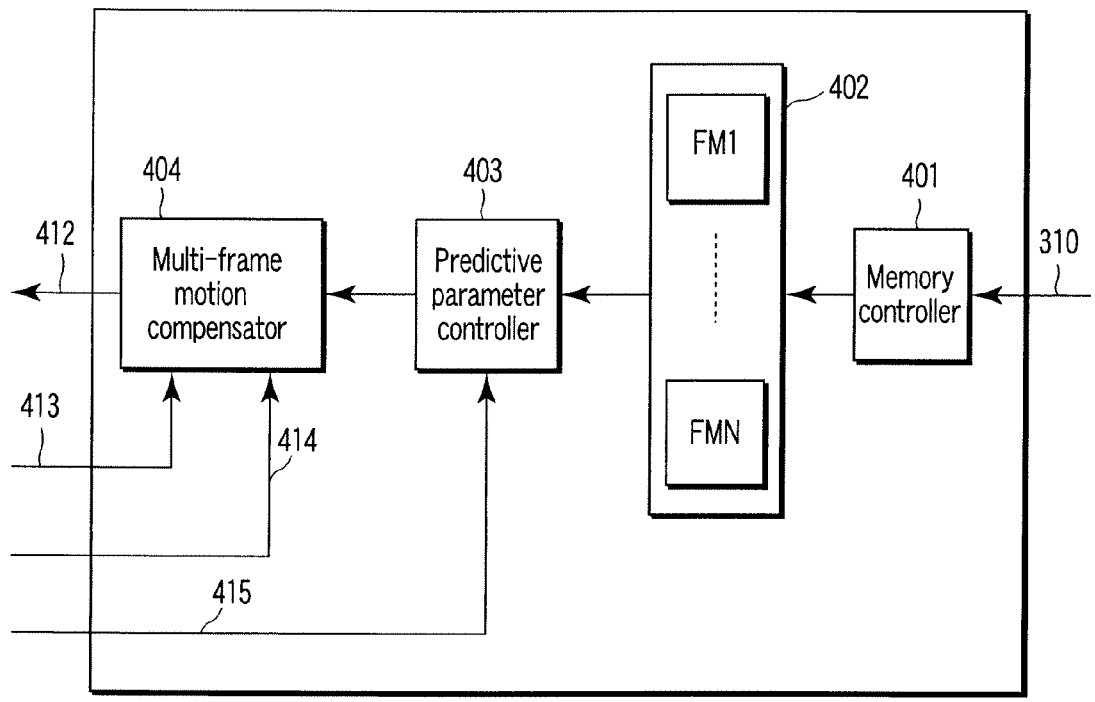
F I G. 10
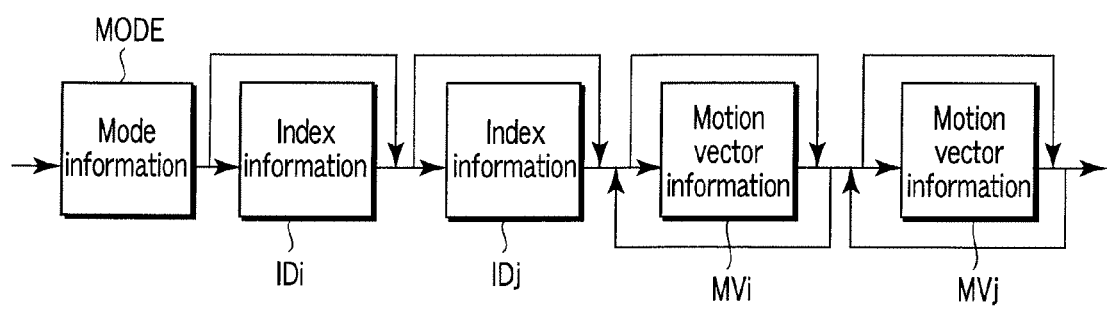
F I G. 11
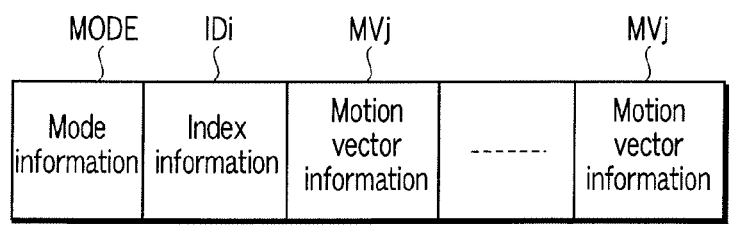
F I G. 12

VIDEO ENCODING/DECODING METHOD AND APPARATUS

CROSS-REFERENCE TO RELATED APPLICATIONS

This is a division of and claims priority under 35 USC §120 from application Ser. No. 10/896,890, filed Jul. 23, 2004, and is a Continuation Application of PCT Application No. PCT/JP03/14658, filed Nov. 18, 2003, which was not published under PCT Article 21(2) in English.

This application is based upon and claims the benefit of priority from prior Japanese Patent Application No. 2002-339931, filed Nov. 22, 2002, the entire contents of which are incorporated herein by reference.

BACKGROUND OF THE INVENTION

1. Field of the Invention

The invention relates to a method of encoding/decoding effectively a fading image and a dissolve image and an apparatus therefor.

2. Description of the Related Art

In a video encoding standard scheme such as ITU-TH.261, H.263, ISO/IECMPEG-2, and MPEG-4, a motion compensated predictive interframe encoding is used as one of encoding modes. As a predictive model in the motion compensated predictive interframe encoding is adopted a model indicating the most high predictive efficiency when luminosity does not vary in a time axis. In the case of the fading image that luminosity of the image varies, for example, in the case of fading-in from a black image to a normal image, a method of performing a prediction adequately according to a change of luminosity of the image is not known. Consequently, there is a problem to need the large number of encoded bits for the purpose of maintaining an image quality in a fading image. fading-in from a black image to a normal image, a method of performing a prediction adequately according to a change of luminosity of the image is not known. Consequently, there is a problem to need the large number of encoded bits for the purpose of maintaining an image quality in a fading image.

For example, U.S. Pat. No. 3,166,716 discloses a technique of coping with the problem by detecting a fading image area and changing an allocation of the number of encoded bits thereto. Concretely, in the case of the fade-out image, the large number of encoded bits are allocated to an beginning part of the fade-out that brightness varies. The last part of the fade-out usually reduces allocation of the number of encoded bits since it normally becomes a monochrome image resulting in making the encoding easy. With such a way, a total image quality is improved without increasing the total number of encoded bits.

On the other hand, U.S. Pat. No. 2,938,412 discloses an encoding system that deals with the above problem in a fading image by compensating for a reference image according to two parameters of an amount of luminance change and an amount of contrast change.

Thomas Wiegand and Berand Girod, "Multi-frame motion-compensated prediction for video transmission", Kluwer Academic Publishers 2001, provides an encoding system based on a plurality of frame buffers. This system intends to improve a predictive efficiency by generating a predictive image selectively from a plurality of reference frames saved in the frame buffers.

However, the system of U.S. Pat. No. 3,166,716 improves an image quality without increasing the total number of encoded bits in encoding a fading image by detecting a fading image area, and changing an allocation of the number of encoded bits. For this reason, there is the advantage that the encoding can be realized within the framework of an existing encoding system. However, since the prediction efficiency is not essentially improved, a notable improvement of the encoding efficiency cannot be expected.

On the other hand, the system of U.S. Pat. No. 2,938,412 has a merit that the predictive efficiency on a fading image improves. However, the predictive efficiency to be enough for so-called a dissolve image (referred to as a cross fade image) which an image gradually varies from an image to another image cannot be obtained.

The system of Thomas Wiegand and Berand Girod cannot sufficiently deal with a fading image and a dissolve image, and cannot improve a predictive efficiency even if a plurality of reference frames are prepared.

According to the prior art as described above, the large number of encoded bits are required for the fading image and dissolve image to be encoded with high image quality. There is a problem that improvement of the encoding efficiency cannot be expected.

BRIEF SUMMARY OF THE INVENTION

An object of the present invention is to provide a video-encoding method, a video-decoding method, and an apparatus therefor that make it possible to encode in high efficiency a video image whose luminance varies with time such as a fading image and a dissolve image and decrease a computation amount.

In a first aspect of the present invention, in the case of subjecting an input video signal to a motion compensated predictive encoding on a video encoding side by using at least one reference image signal and a motion vector between the input video signal and the reference image signal, if the number of reference images used for a motion compensated predictive encoding is single, there is used a first predictive image signal generation method of generating a predictive image signal according to a reference image number and a predictive parameter of a combination selected for each to-be-encoded region of the input video signal, from a plurality of combinations of at least one reference image number with predictive parameters.

On the other hand, when the number of reference images used for a motion compensated predictive encoding is plural, there is used a second predictive signal generation method of generating a predictive image signal according to a predictive parameter computed every to-be-encoded region based on the reference image numbers of the plurality of reference images and an image-to-image distance of the plurality of reference images.

A predictive error signal expressing an error of a predictive image signal generated in this way with respect to an input video signal is generated, and index information indicating either of a set of the predictive error signal and motion vector information and a set of a selected combination and the reference image numbers of a plurality of reference images is encoded.

In another aspect of the present invention, when a predictive type of a to-be-encoded region of an input video signal is a first predictive type to use a reference image for a motion compensated predictive encoding, a first prediction signal generation method is used. When a predictive type of a to-be-encoded region is a bidirectional predictive type and the number of reference images used for a motion compensated predictive encoding is plural, a second predictive signal generation method is used.

On the other hand, on a video decoding side, coded data including a predictive error signal representing an error of a predictive image signal with respect to a video signal, motion vector information, and index information indicating either of a combination of the reference image number and a predictive parameter and the reference image numbers of a plurality of reference images are decoded. When the decoded index information represents the combination, a predictive image signal is generated according to the reference image number and predictive parameter of the combination. When the decoded index information represents the reference image number of a plurality of reference images, a predictive image signal is generated according to the reference image number and a predictive parameter computed based on an image-to-image distance of the plurality of reference images. A playback video signal is generated using the predictive error signal and predictive image signal generated in this way.

According to the present invention as thus described, a first predictive image generation method of generating a predictive image signal according to a combination of the reference image number and a predictive parameter, and a second predictive image generation method of generating a predictive image signal using a predictive parameter calculated based on a frame-to-frame distance of selected plurality of reference images are prepared, and either thereof is selected according to the number of reference images and a predictive type that are used for a motion compensated predictive encoding.

As a result, an appropriate predictive image signal can be generated by a predictive system with a higher predictive efficiency for an input video signal from which a predictive image signal cannot be appropriately generated by a predictive system of a normal video encoding, for example, a fading image and a dissolve image, too.

In addition, since it is possible to set the number of times of multiplication per a pixel to one time, a hardware scale and an operation cost can be reduced in both of the encoding side and the decoding side.

Further, information concerning a reference image number and a predictive parameter is not sent from the encoding side to the decoding side, but index information indicating combination of a reference image number with a predictive parameter, or index information indicating combination of predictive parameters is sent in the case of sending the reference image number separately. As a result, the encoding efficiency can be improved.

BRIEF DESCRIPTION OF THE SEVERAL VIEWS OF THE DRAWING

FIG. 10 is a block diagram illustrating a detailed configuration of a frame memory/predictive image generator in FIG. 9.

FIG. 11 is a diagram showing an example of syntax every block in the case of encoding index information.

FIG. 12 is a diagram showing an example of a concrete encoded bit stream in the case of generating a predictive image using a single reference image.

DETAILED DESCRIPTION OF THE INVENTION

An embodiment of the present invention will now be described with reference to drawings.

First Embodiment (With Reference to the Encoding Side)

Figure 1:
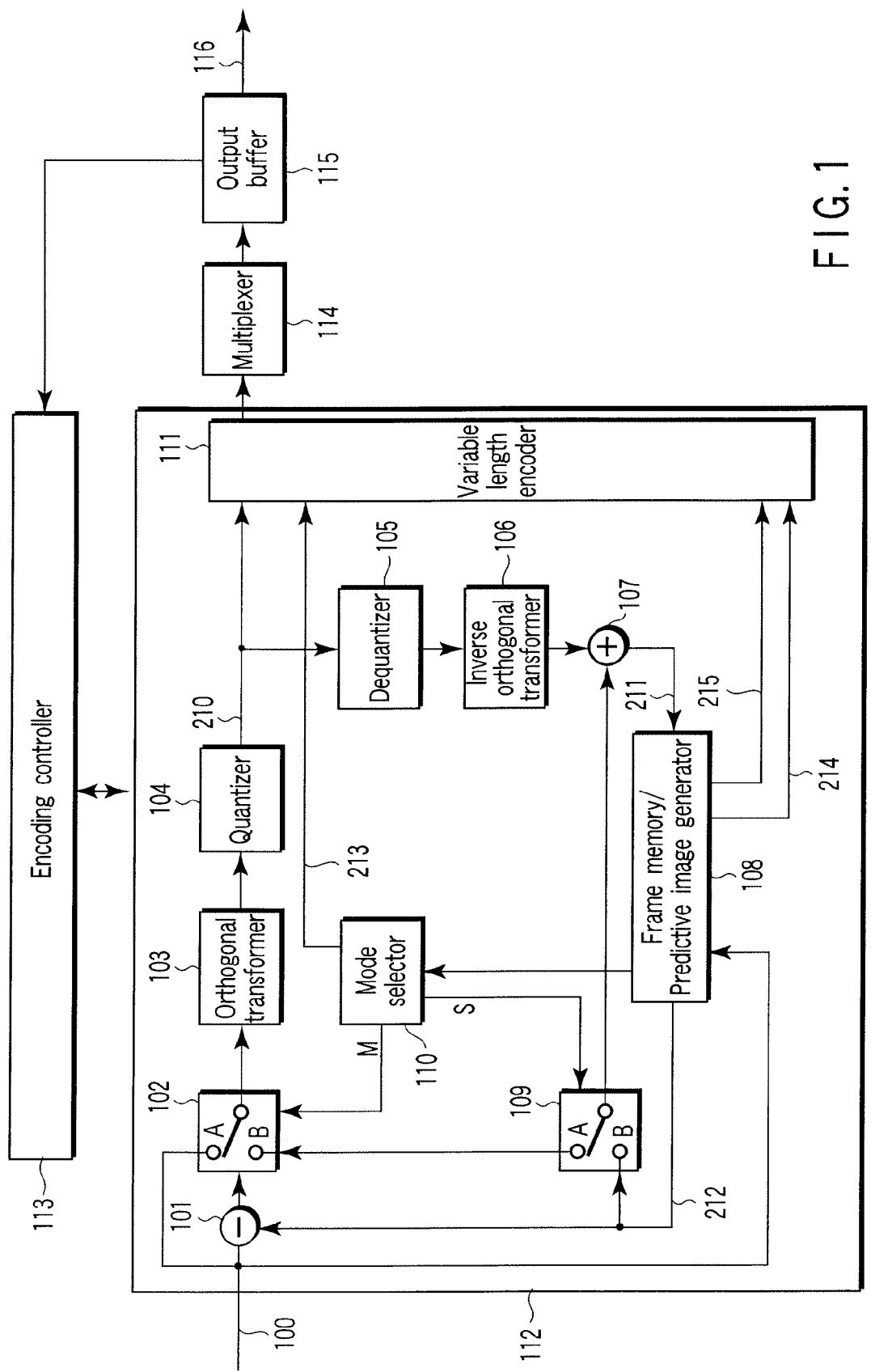
FIG. 1 is a block diagram showing configuration of a video encoding apparatus relating to a first embodiment of the present invention.

FIG. 1 shows configuration of a video encoding apparatus related to the first embodiment of the present invention. To the video encoding apparatus is input a video signal 100 in units of a frame, for example, in this example. This video signal 100 is input to a subtracter 101 to generate a predictive error signal by obtaining a difference with respect to a predictive image signal 212. Either of the predictive error signal and input video signal 100 is selected with a mode selection switch 102, and subjected to an orthogonal transformation, for example, discrete cosine transform (DCT) with an orthogonal transformer 103. The orthogonal transformer 103 generates orthogonal transformed coefficient information, for example, DCT coefficient information. The orthogonal transformed coefficient information is quantized with a quantizer 104, and then quantized orthogonal transformed coefficient information 210 is led to a variable length encoder 111.

Further, the quantized orthogonal transformed coefficient information 210 is input to a local decoder. In this local decoder, the quantized orthogonal transformed coefficient information 210 is subjected to a process to be inversive to that of the quantizer 104 and orthogonal transformer 103 with a dequantizer 105 and an inverse orthogonal transformer 106, to reconstruct a signal similar to the predictive error signal. Thereafter, the reconstructed signal is added to a predictive image signal 212 input through a switch 109 with an adder 107 to generate a local decoded image signal 211. The local decoded image signal 211 is input to a frame memory/predictive image generator 108.

The frame memory/predictive image generator 108 selects one combination from a plurality of combinations of a reference frame number and a predictive parameter that are prepared beforehand. The image signal (local decoded image signal 211) of the reference frame indicated by the reference frame number of the selected combination is subjected to computation for a linear sum according to a predictive parameter in the selected combination. Further, in this example, a reference image signal of a frame unit is generated by adding an offset to the linear sum according to the predictive parameter. Thereafter, the frame memory/predictive image generator 108 subjects the reference image signal to motion compensation using a motion vector to generate a predictive image signal 212.

In this process, the frame memory/predictive image generator 108 generates motion vector information 214 and index information 215 indicating selected combination of the reference frame number and predictive parameter, and further sends information to be necessary for selection of an encoding mode to the mode selector 212. The motion vector information 214 and index information 215 are input to the variable length encoder 111. The frame memory/predictive image generator 108 will be described in detail later.

A mode selector 110 selects an encoding mode in units of a macroblock based on the predictive information P from the frame memory/predictive image generator 108, that is, selects either of an intraframe encoding and a motion compensated predictive interframe encoding to output switch control signals M and S.

In the intraframe encoding mode, switches 102 and 112 are switched to A side by the switch control signals M and S, whereby the input video signal 100 is input to the orthogonal transformer 103. In the interframe encoding mode, the switches 102 and 112 are switched to a B side by the switch control signals M and S, so that the predictive error signal from the subtracter 102 is input to the orthogonal transformer 103, and the predictive image signal 212 from the frame memory/predictive image generator 108 is input to the adder 107. The mode information 213 is output from the mode selector 212 and input to the variable length encoder 111.

In the variable length encoder 111, the orthogonal transformed coefficient information 210, mode information 213, motion vector information 214 and index information 215 are subjected to a variable length encoding. Each variable-length code generated in this way is multiplied and then filtered by the output buffer 115. Thus, the encoded data 116 output from the output buffer 115 is sent to the transmission system or a storage system not shown.

The encoding controller 113 monitors control of the encoder 112, concretely, for example, a buffering volume of the output buffer 115, and controls an encoding parameter such as quantization step size of the quantizer 104 for the purpose of making the buffering volume constant.

(With Reference to the Frame Memory/Predictive Image Generator 108)

Figures 2, 3:
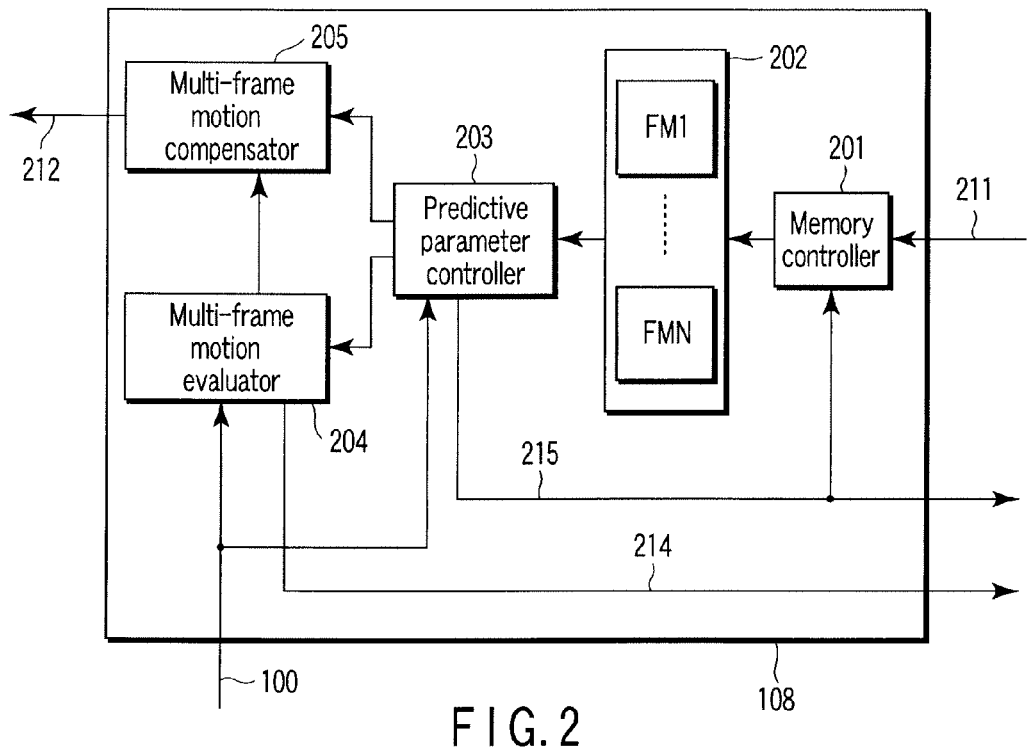
FIG. 2 is a block diagram showing detailed configuration of a frame memory and a predictive image generator in the embodiment.
FIG. 3 is a diagram showing an example of a combination table according to a reference image number and a predictive parameter to use in the embodiment.

FIG. 2 shows detailed configuration of the frame memory/predictive image generator 108 in FIG. 1. In FIG. 2, the local decoded image signal 211 input from the adder 107 in FIG. 1 is stored in the frame memory set 202 under control of the memory controller 201. The frame memory set 202 comprises a plurality of (N) frame memories FM1 to FMN for temporally storing the local decoded image signal 211 as a reference frame.

The predictive parameter controller 203 prepares a plurality of combinations of a reference frame number and a predictive parameter as a table beforehand. The predictive parametric controller 203 selects a combination of a reference frame number of the reference frame used for generating a predictive image signal 212 based on the input video signal 100 and a predictive parameter, and outputs index information 215 indicating the selected combination.

A plurality of frame motion evaluators 204 each generates a reference image signal according to the combination of the reference frame number and index information, which is selected with the predictive parameter controller 203. The plurality of frame motion evaluators 204 evaluates an amount of motion and a predictive error from this reference image signal and the input image signal 100, and outputs motion vector information 214 which makes a prediction error minimum. A plurality of frame motion compensators 205 generate the predictive image signal 212 by subjecting the reference image signal selected with the plurality of frame motion evaluator 204 every block to motion compensation according to the motion vector.

(With Reference to Generation of a Predictive Image)

The following equations (1), (2) and (3) each show an example of a predictive equation using a reference image number and a predictive parameter which are prepared with the predictive parameter controller 203. An example as shown in here shows predictive equations applied to a case that a to-be-encoded image as referred to as so-called P picture is subjected to a motion compensated prediction using a single reference image (reference picture) to generate a predictive image signal, and a case that a to-be-encoded image as referred to as so-called B picture is subjected to a motion compensated prediction using only one of two reference images to generate a predictive image signal.

$$Y = \mathrm{clip}((D_1(i) \times R_Y(i) + 2^{L_Y-1}) >> L_Y + D_2(i)) \quad (1)$$

$$Cb = \mathrm{clip}((E_1(i) \times (R_{Cb}(i) - 128) + 2^{L_C-1}) >> L_C + E_2(i) + 128) \quad (2)$$

$$Cr = \mathrm{clip}(F(i)_1 \times (R_{Cr}(i) - 128) + 2^{L_C-1}) >> L_C + F_2(i) + 128) \quad (3)$$

Y indicates a predictive image signal of a luminance signal, Cb and Cr indicate predictive image signals of two color-difference signals, and RY(i), RCb(i) and RCr(i) indicate luminance signal and pixel values of two color-difference signals of the reference image signal of index i. D1(i) and D2(i) indicate a predictive coefficient of the luminance signal of the index i, and an offset, respectively. E1(i) and E2(i) indicate a predictive coefficient of the color-difference signal Cb of the index i and offsets respectively. F1(i) and F2(i) indicate a predictive coefficient of the color-difference signal Cr of the index i, and an offset respectively. The index i indicates a value from zero to (the maximum number of reference images −1) and is encoded every to-be-encoded block (for example, every macroblock) and transmitted by the video decoding apparatus.

Prediction parameters D1(i), D2(i), E1(i), E2(i), F1(i), and F2(i) are values determined between the video encoding apparatus and the decoding apparatus beforehand, or predetermined encoding units such as a frame, a field or a slice, and shared with both apparatuses by being encoded along with encoded data and transmitted from the video encoding apparatus to the decoding apparatus.

The equations (1), (2) and (3) are predictive equations making it possible to avoid a division process by choosing denominator of the predictive coefficient multiplied by the reference image signal like two exponentiation, namely, 2, 4, 8, 16, . . . , and compute by an arithmetic shift. By this, it is possible to avoid increase of a computation cost by the division process.

In other words, when >> in equations (1), (2) and (3) assumes a >> b, it is an operator subjecting an integer a to an arithmetic shift by b bits to the right. Function clip( ) is a clipping function which is set to 0 when the value within ( ) is smaller than 0, and to 255 when it is larger than 255, and the integer of 255 is returned from 0.

LY is a shift amount of a luminance signal, and LC is a shift amount of a color-difference signal. These shift amounts LY and LC use values determined with a video encoding apparatus and a decoding apparatus beforehand. Alternatively, they are shared with both apparatuses by being encoded along with a table and coded data in an encoding unit such as a frame, a field or a slice, which is predetermined in a video encoding apparatus, and transmitted to the video decoding apparatus.

In the present embodiment, a combination table of a reference image number and a predictive parameter, which is shown in FIG. 3 is prepared in the predictive parameter controller 203 in FIG. 2. This table is used when the number of reference image is 1. In FIG. 3, the index i corresponds to the predictive image which can be selected every block. In this example, there are four kinds of predictive images in correspondence with 0-3 of the index i. The reference image number is, in other words, the number of a local decoded image used as a reference image. The table shown in FIG. 3 includes predictive parameters D1 (i), D2 (i), E1(i), E2 (i), F1(i), and F2 (i) that are assigned to a luminance signal and two color-difference signals in correspondence with equations (1), (2) and (3).

Flag is a flag indicating whether the predictive equation using the predictive parameters is applied to the reference image number designated by the index i.

If Flag is "0", the motion compensated prediction is performed using the local decoded image of the reference image number designated by the index i without using the predictive parameter.

If Flag is "1", the motion compensated prediction is done by generating a predictive image according to the equations (1), (2) and (3), using the predictive parameter and the local decoded image of the reference image number designated by the index i. The Flag information uses values determined with a video encoding apparatus and a decoding apparatus beforehand. Alternatively, it is shared with both apparatuses by being encoded along with a table and coded data in an encoding unit such as a frame, a field or a slice, which is predetermined in a video encoding apparatus, and transmitted to the video decoding apparatus.

In these examples, when the index is i=0 with respect to the reference image number 105, a predictive image is generated using the predictive parameter. In the case of i=0, the motion compensated prediction is performed without using the predictive parameter. As thus described, there may be a plurality of predictive schemes with respect to the same reference image number.

The following equations (4), (5) and (6) show an example of predictive equations for a reference image number and a predictive parameter prepared with the predictive parameter controller 203 when a predictive image signal is generated using two reference images.

$$P=\text{clip}((W_0(i,j) \times R(i)+W_1(i,j) \times R(j)+2^{L-1})>>L) \quad (4)$$

$$W_0(i,j)=2^L-W_1(i,j) \quad (5)$$

$$W_1(i,j) = \begin{cases} \text{clip2}\left(\dfrac{U(n,i) \times 2^L}{U(j,i)}\right), & U(i,j) \neq 0 \\ 2^{L-1}, & U(i,j) = 0 \end{cases} \quad (6)$$

Since the relation of the equation (5) is established, the equation (4) can be transformed as follows:

$$P=\text{clip}((R(i)<<L+W(i,j) \times (R(j)-R(i))+2^{L-1})>>L) \quad (7)$$

$$W(i,j) = \begin{cases} \text{clip2}\left(\dfrac{U(n,i) \times 2^L}{U(j,i)}\right), & U(i,j) \neq 0 \\ 2^{L-1}, & U(i,j) = 0 \end{cases} \quad (8)$$

This shows an example of a predictive equation for the case of performing a bidirectional prediction in the case of so-called B picture. Two indexes i and j exist, and R(i) and R(j) indicate the reference images corresponding to the indexes i and j respectively. Consequently, it is assumed that two information items i and j are sent as the index information. W (j, j) indicates a predictive coefficient in the indexes i and j. The function U used for computation of a predictive coefficient is a function representing an image-to-image distance, and U(i, j) represents a distance between the reference image designated by the index i and the reference image designated by the index j. n indicates a position of an image to be encoded currently.

In the present embodiment, it is assumed that the more past image has position information of a smaller value. Consequently, if the reference image designated by the index i is more future in terms of time than the reference image designated by the index j, U (i, j)>0. If the indexes i and j represent the same reference image in terms of time, U(i, j)=0. If the reference image designated by the index i is more past in terms of time than the reference image designated by the index j, U(i, j)<0. When U(i, j) is 0, the predictive coefficient W assumes 2L−1.

Figure 4:
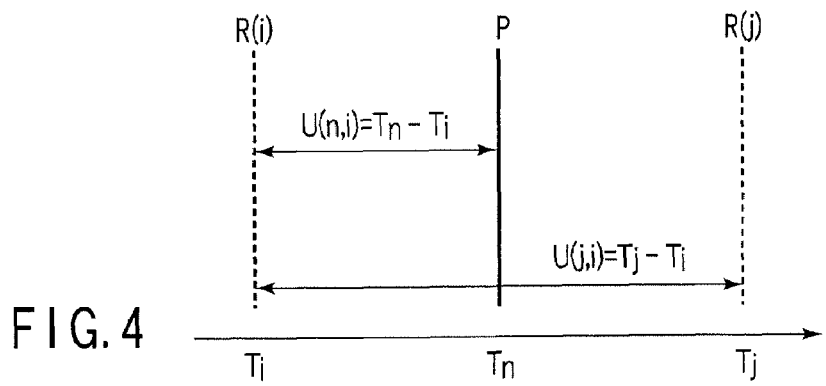
FIG. 4 is a diagram showing a first position relation between two reference images and a to-be-encoded image in the embodiment.

Concretely, a temporal position relation between a to-be-encoded image to be encoded currently and two reference images is expressed as shown in FIGS. 4 to 7 using the indexes i and j. FIG. 4 shows an example that the to-be-encoded image n is interpolated between the reference image designated by the index i and the reference image designated by the index j.

Tn, Ti and Tj express positions of the to-be-encoded image, the reference image designated by the index i, and the reference image designated by the index j, respectively. The value increases toward the right. Consequently, the relation of Ti<Tn<Tj is established. The function U used for computation of the predictive coefficient W is obtained by U(n, i)=Tn−Ti, and U(j, i)=Tj−Ti, where U(n, i)>0, and U(j, i)>0.

Figure 5:
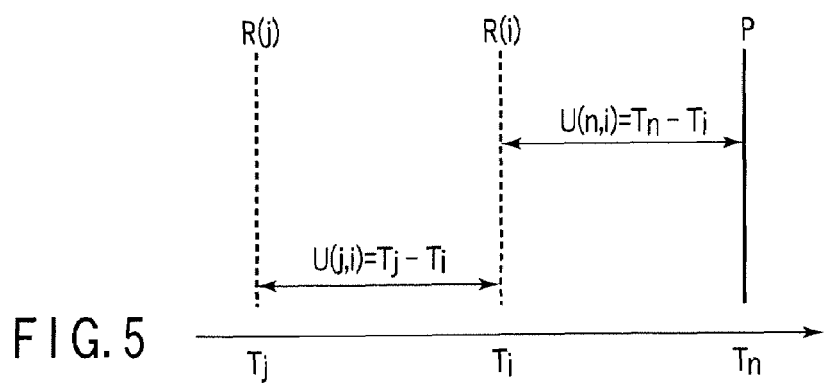
FIG. 5 is a diagram showing a second position relational between two reference images and a to-be-encoded image in the embodiment.

FIG. 5 shows an example wherein the reference image designated by the index i and the reference image designated by the index j both are in a past position in terms of time than the to-be-encoded image n. In other words, U(n, i)>0, and U(j, i)≦0.

Figure 6:
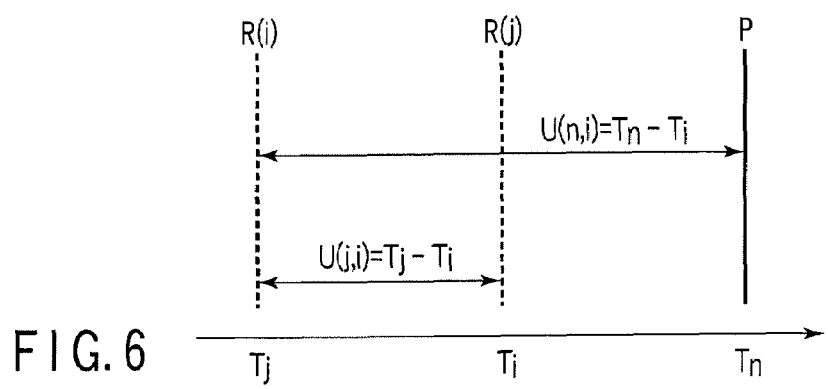
FIG. 6 is a diagram showing a third position between two reference images and a to-be-encoded image in the embodiment.

FIG. 6 shows another example wherein the reference image designated by the index i and the reference image designated by the index j both are in a past position in terms of time than the to-be-encoded image n. In other words, U(n, i)>0, and U(j, i)≧0.

Figure 7:
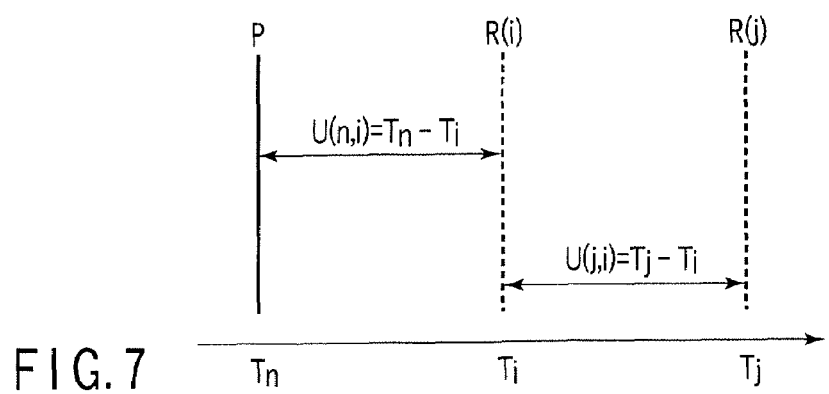
FIG. 7 is a diagram showing a fourth position relation between two reference images and a to-be-encoded image in the embodiment.

FIG. 7 shows an example wherein the reference image designated by the index i and the reference image designated by the index j both are in a future position in terms of time than the to-be-encoded image n. In other words, U(n, i)<0, and U(j, i)≧0.

L is a shift amount in the equations (4) to (8). The shift amount uses a value determined between the video encoding apparatus and the decoding apparatus beforehand, or is transmitted from the video encoding apparatus to the decoding apparatus with being encoded along with encoded data in a predetermined encoding unit such as a frame, a field or a slice, and shared with both apparatuses. Further, the function of clip2 in the equations (6) and (8) is a function for returning an integer with limiting the maximum value and the minimum value of the weighting factors obtained by computation using a value (referred to as a value simply) within ( ) of clip2( ), that is, an image-to-image distance. A plurality of configuration examples concerning this function clip2 are shown hereinafter.

A first configuration of the function clip2 is a clipping function that makes $-2^M$, when the value is smaller than $-2^M$, and $(2^M-1)$, when it is larger than $(2^M-1)$. The integer not less than $-2^M$ and not more than $(2^M-1)$ is returned. With such configuration, if the pixel is 8 bits, 9 bits are necessary for expression of the value of (R (j) −R (i)), and (M+10) bits are necessary for expression of the predictive coefficient W.

Therefore, it is possible to compute a predictive image value with an operation precision of (M+10) bits. M assumes a non-negative integer not less than L.

A second configuration of the function clip2 assumes a function having a rule that it is set at $2^{L-1}$ when the value is smaller than $-2^M$, and at $2^{L-1}$ when the value is larger than $(2^M-1)$, and returning an integer not less than $-2^M$ and not more than $(2^M-1)$. With this configuration, when a distance relation between two reference images is exceptional, all images can be subjected to an average prediction.

A third configuration of the function clip2 is a clipping function setting at 1 when the value is smaller than 1, and $2^M$ when the value is larger than $2^M$, and a function returning an integer not less than 1 and not more than $2^M$. The difference with respect to the first configuration of the function clip2 is that the value of the predictive coefficient W does not become negative, resulting in that the positional relation of the reference image is limited more. Consequently, even if two identical reference images are combined, it is possible to change a prediction based on the predictive coefficient W and an average prediction to each other by inverting the ways designated by the indexes i and j as the relations of FIGS. 5 and 6.

A fourth configuration of the function clip2 is a clipping function setting at 0 when the value is smaller than 0, and $2^L$ when the value is larger than $2^L$, and a function returning an integer not less than 0 and not more than $2^L$. With such configuration, the value of the predictive coefficient W becomes always a non-negative value not more than $2^L$, so that an extrapolation prediction is prohibited. Alternatively, either of two reference images is used for prediction in a bidirectional prediction, too.

A fifth configuration of the function clip2 is a clipping function setting at $2^L-1$ when the value is smaller than 1, and $2^L-1$ when the value is larger than $2^L$, and a function returning an integer not less than 1 and not more than $2^L-1$. With such configuration, the value of the predictive coefficient W becomes always a non-negative value not more than $2^L-1$, so that an extrapolation prediction is prohibited. Alternatively, it is used for an average prediction of two reference images.

When a distance between two reference images is unknown or undefined, for example, when either of the reference images or both thereof are reference images for the background and the storage, the predictive coefficient W assumes to be set at the value of 2L–1. The predictive coefficient W can be beforehand computed in an encoding unit such as a frame, a field, or a slice. Therefore, even when a predictive image signal is generated with two reference images, the computation per pixel can be completed by multiplication of one time.

$$P=\mathrm{clip}(R(i)+(W(i,j)\times(R(j)-R(i))+2^{L-1})>>L) \quad (9)$$

Equation (9) is another example modifying the equation (4). In the equation (7), the operation for subjecting R(i) to an arithmetic shift by L bits to the left beforehand was needed. However, in the equation (10), the arithmetic shit is omitted by bringing out it from a parenthesis. As a result, it is effective that an operation amount can be decreased by the amount of the arithmetic shift. Instead, the orientation of rounding when the shifting is done varies upon a large and small relation of the values of R(i) and (R)j. Therefore, the same result as the equation (4) is not obtained.

The following equations (10) to (20) may be used replacing with the equations (4) to (8). This is a method similar to a method of generating a predictive image using a single reference image, that is, a method of generating a final predictive image by generating a predictive image of a single reference image of the index i and a predictive image of a single reference image of the index j and averaging them. Since the same process routine as that using a single reference image can be used until a halfway step of the process, the method has an advantage of making it possible to reduce an amount of hardware and an amount of codes.

$$P_Y(i)=(W_0(i)\times R_Y(i)+2^{L_Y-1})>>L_Y \quad (10)$$

$$P_Y(j)=(W_1(j)\times R_Y(j)+2^{L_Y-1})>>L_Y \quad (11)$$

$$P_{Cb}(i)=(W_0(i)\times(R_{Cb}(i)-128)+2^{L_C-1})>>L_C+128 \quad (12)$$

$$P_{Cb}(j)=(W_1(j)\times(R_{Cb}(j)-128)+2^{L_C-1})>>L_C+128 \quad (13)$$

$$P_{Cr}(i)=(W_0(i)\times(R_{Cr}(i)-128)+2^{L_C-1})>>L_C+128 \quad (14)$$

$$P_{Cr}(j)=(W_1(j)\times(R_{Cr}(j)-128)+2^{L_C-1})>>L_C+128 \quad (15)$$

$$Y=\mathrm{clip}(P_Y(i)+P_Y(j)+1)>>1 \quad (16)$$

$$Cb=\mathrm{clip}(P_{Cb}(i)+P_{Cb}(j)+1)>>1 \quad (17)$$

$$Cr=\mathrm{clip}(P_{Cr}(i)+P_{Cr}(j)+1)>>1 \quad (18)$$

$$W_0(i,j)=\begin{cases} 2^{L+1}\mathrm{clip2}\left(\dfrac{U(n,i)\times 2^{L+1}}{U(j,i)}\right), & U(i,j)\neq 0 \\ 2^L, & U(i,j)=0 \end{cases} \quad (19)$$

$$W_1(i,j)=\begin{cases} \mathrm{clip2}\left(\dfrac{U(n,i)\times 2^{L+1}}{U(j,i)}\right), & U(i,j)\neq 0 \\ 2^L, & U(i,j)=0 \end{cases} \quad (20)$$

(With Reference to a Procedure for a Selection of a Predictive Scheme and an Encoding mode Determination)

Figure 8:
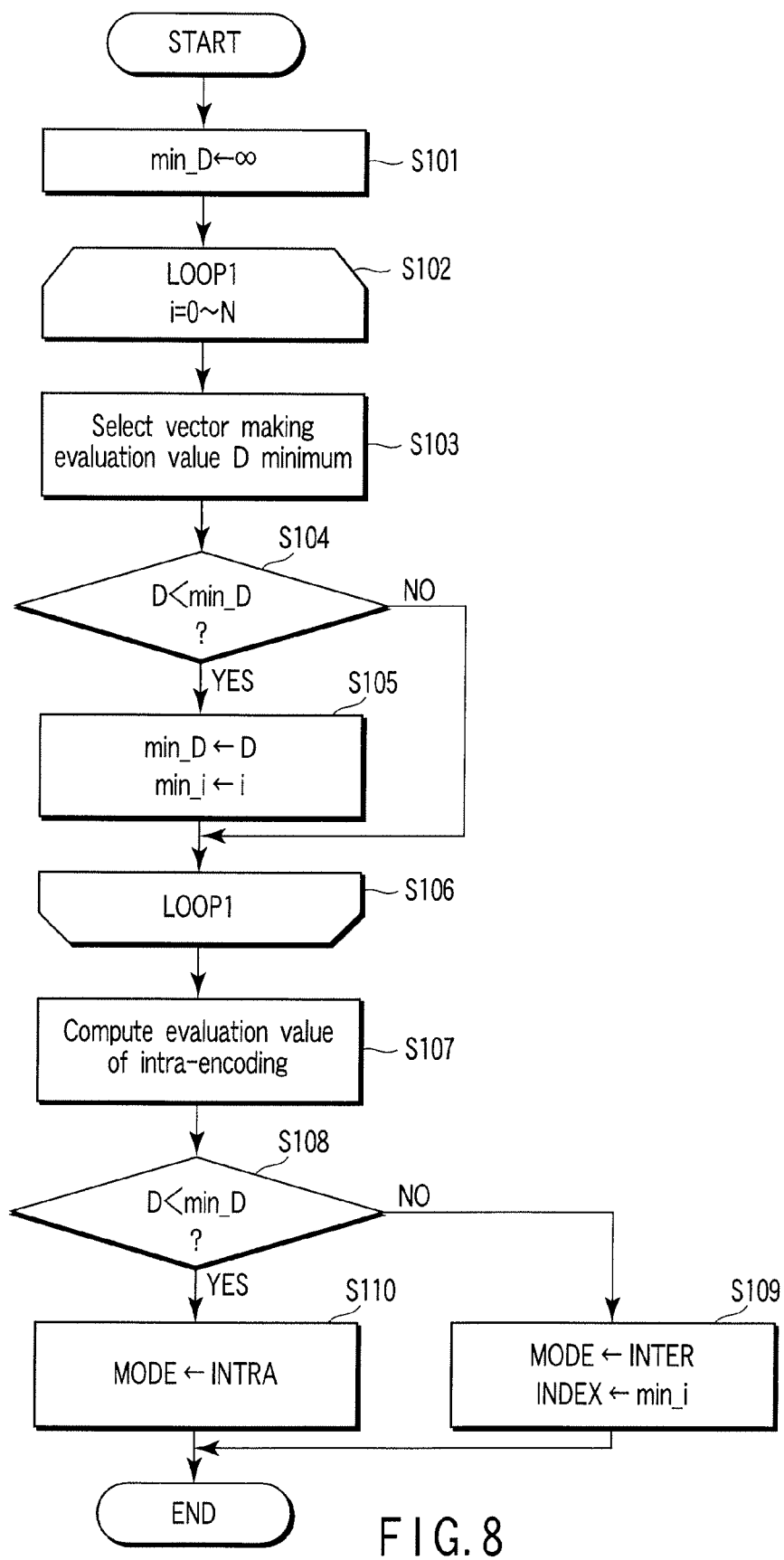
FIG. 8 is a flowchart showing an example of a procedure of a selection of a predictive scheme every macroblock (combination of a reference image number with a predictive parameter) and an encoding mode determination.

An example of a concrete procedure of a selection of a prediction scheme (combination of a reference image number with a predictive parameter) and an encoding mode determination every macroblock in the present embodiment will be described referring to FIG. 8.

The assumable maximum value is set to a variable min_D (step S101). LOOP1 (step S102) shows a repetition process for use in selection of a predictive scheme in interframe encoding. Variable i represents a value of the index shown in FIG. 3. The evaluation value D of each index (combination of a reference frame number with a predictive parameter) is computed from the number of encoded bits concerning motion vector information 214 (the number of encoded bits of the variable-length code output from the variable length coding device 111 in correspondence with the motion vector information 214) and a prediction error absolute value sum, so that the optimum motion vector can be derived every predictive scheme. A motion vector which makes the evaluation value D a minimum value is selected (step S103). This evaluation value D is compared with min_D (step S104). If the evaluation value D is smaller than min_D, the evaluation value D is assumed min_D, and the index i is substituted in min_i (step S105).

The evaluation value D in the case of intraframe encoding is computed (step S106). This evaluation value D is compared with min_D (step S107). If, as a result of this comparison, min_D is smaller, the mode MODE is determined to be an interframe encoding, and min_i is substituted in index information INDEX (step S108). If the evaluation value D is smaller, the mode MODE is determined to be an intraframe encoding (step S109). The evaluation value D assumes an estimated value of the number of encoded bits at the same quantization step size.

(With Reference to the Decoding Side)

Figure 9:
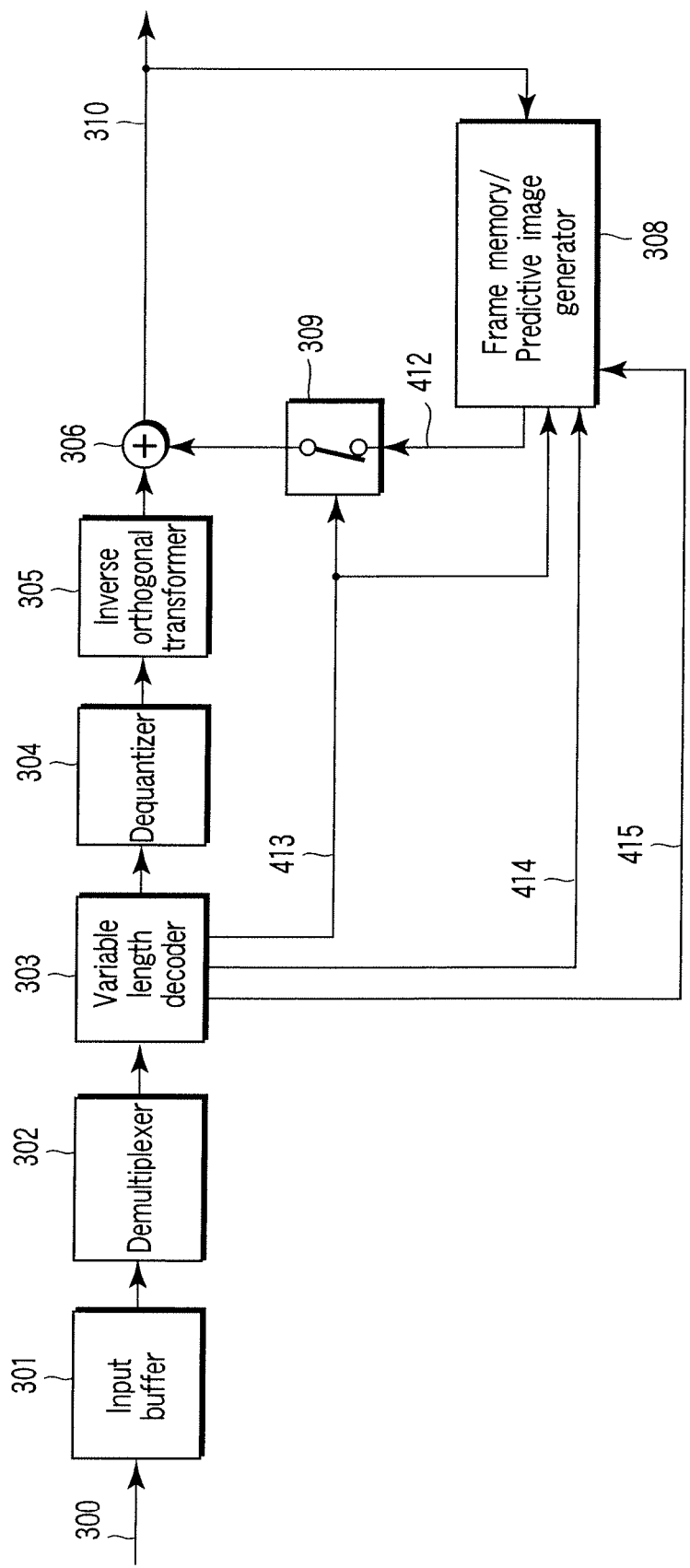
FIG. 9 is a block diagram showing configuration of a video decoding apparatus relative to the embodiment.

The video decoding apparatus corresponding to the video encoding apparatus shown in FIG. 1 will be described. FIG. 9 shows configuration of the video decoding apparatus related to the present embodiment. Coded data 300 sent out from the video encoding apparatus of the configuration shown in FIG. 1 and passed through a transmission system or a storage system is saved in an input buffer 301 once. The coded data 300 of the input buffer 301 is divided based on syntax by a demultiplexer 302 for each frame, and then input to the variable length decoder 303. The variable length decoder 303 decodes the variable-length code of each syntax of the coded data 300 to reproduce quantized orthogonal transformed coefficients, mode information 413, motion vector information 414 and index information 415.

The quantized orthogonal transformed coefficient of the reproduced information is dequantized with the dequantizer 304. The dequantized coefficient is subjected to an inverse-orthogonal transformation with the inverse orthogonal transformer 305. When the mode information 413 indicates the intraframe encoding mode, a playback image signal is output from the inverse orthogonal transformer 305, and output as an ultimate playback image signal 310 via the adder 306. When the mode information 413 indicates the interframe encoding mode, a predictive error signal is output from the inverse orthogonal transformer 305, and further a mode selection switch 308 is turned on. The playback image signal 310 is output by adding the predictive error signal and the predictive image signal 412 output from the frame memory/predictive image generator 308 with the adder 306. The playback image signal 310 is stored in the frame memory/predictive image generator 308 as a reference image signal.

The mode information 413, motion vector information 414 and index information 415 are input to the frame memory/predictive image generator 308. The mode information 413 is input to the mode selection switch 309, which is turned on in the case of the interframe encoding mode and turned off in the case of the intraframe encoding mode.

The frame memory/predictive image generator 308 prepares for a table a plurality of combinations of the reference image number and predictive parameter that are prepared similarly to the frame memory/predictive image generator 108 of the encoding side as shown in FIG. 1, and selects one combination designated by the index information 415 from the table. The image signal (playback image signal 310) of the reference image designated by the reference image number of the selected combination is subjected to a linear sum according to the predictive parameter of the selected combination. Further, the offset according to the predictive parameter is added to the reproduced image signal 310. As a result, a reference image signal is generated. Thereafter, the predictive image signal 412 is generated by subjecting the generated reference image signal to motion compensation using a motion vector indicated by the motion vector information 414.

(With Reference to Frame Memory/Predictive Image Generator 308)

FIG. 10 shows detailed configuration of the frame memory/predictive image generator 308 in FIG. 9. In FIG. 10, the reproduced image signal 310 output from the adder 306 in FIG. 9 is stored in the frame memory set 402 with control by a memory controller 401. The frame memory set 402 comprises a plurality of (N) frame memories FM1 to FMN to save temporally the playback image signal 310 as a reference image.

The predictive parameter controller 403 prepares as a table combination of a reference image number with a predictive parameter as shown in FIG. 3 beforehand, and selects combination of the reference image number of the reference image used for generation of the predictive image signal 412 with the predictive parameter based on the index information 415 from the variable length decoders 303 in FIG. 9. A plurality of frame motion compensators 404 generates a reference image signal according to combination of the reference image number with the index information which is selected by the predictive parameter controller 403. The predictive image signal 412 is generated by subjecting the reference image signal to motion compensation in units of a block according to a motion vector indicated by the motion vector information 414 from the variable length decoder 303 in FIG. 9.

(With Reference to Syntax of Index Information)

FIG. 11 shows an example of syntax when encoding index information in each block. Each block has mode information MODE. It is determined whether index information IDi indicating a value of the index i and index information IDj indicating a value of the index j are encoded according to the mode information MODE. After encoded index information, motion vector information MVi for motion compensated prediction of the index i and motion vector information MVi for motion compensated prediction of index i and index j is encoded as motion vector information of each block.

(With Reference to the Data Structure of an Encoding Bit Stream)

FIG. 12 shows an example of a concrete encoding bit stream every block when generating a predictive image using a single reference image. Index information IDi is disposed following the mode information MODE and motion vector information MVi is disposed thereafter. The motion vector information MVi is usually two-dimensional vector information. Further, a plurality of two-dimensional vectors may be send depending upon the motion compensation method in the block that is designated by the mode information.

Figure 13:
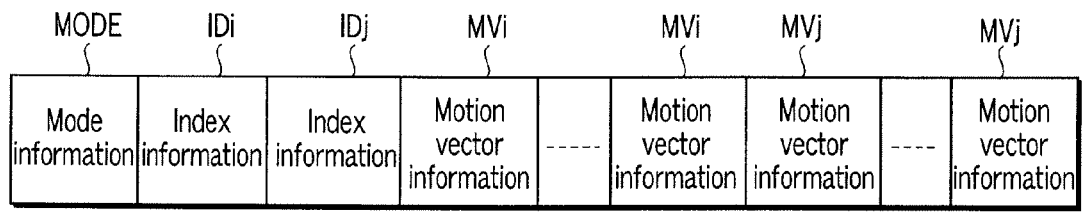
FIG. 13 is a diagram showing an example of a concrete encoded bit stream in the case of generating a predictive image using two reference images.

FIG. 13 shows an example of a concrete encoding bit stream every block when generating a predictive image using two reference images. Index information IDi and index information IDj are disposed following mode information MODE, and motion vector information MVi and motion vector information MVj are disposed thereafter. The motion vector information MVi and the motion vector information j are usually two-dimensional vector information. Further, a plurality of two-dimensional vectors may be send depending upon the motion compensation method in the block that is designated by the mode information.

According to the present embodiment as discussed above, when a predictive image is generated using a single reference image, the predictive image is generated by a linear prediction using a predictive coefficient and an offset as the predictive parameters. This method permits generation of an appropriate predictive image for a field image corresponding to an image obtained by combining monochrome images. In a method of selecting simply one combination from a plurality of combinations of a reference picture number and a predictive parameter, when there is a plurality of reference images, the multiplication per pixel must be performed a plurality of times. This increases an amount of computation. However, in the present embodiment, the necessary multiplication may be one time per pixel.

On the other hand, when a predictive image is generated by means of two reference images, the predictive image is generated by obtaining weighted mean of the two reference images, using a weighting factor and an offset that are obtained from a distance between the two reference images. This method makes it possible to generate an appropriate predictive image for a dissolve image in which two images are mixed. In this time, if the equation used in the present embodiment is used, a necessary multiplication may be one time per pixel.

According to the present embodiment as thus described, an appropriate predictive image can be generated for a feed image as well as a dissolve image by one time of multiplication per pixel. Since the multiplication can be completed one time per pixel, a hardware scale and an operation cost can be decreased in both of an encoding side and a decoding side.

In the above description, the method of generating a predictive image is changed according to the number of reference images. However, the method of generating a predictive image may be changed in units of image or in units of slice according to a difference of a prediction type as referred to as so-called a picture type or a slice type. When only either one of the reference images in the case of, for example, a B picture is used, the predictive image is not generated using the predictive parameter, but the motion compensated prediction is carried out using normal local decoded image.

Figure 14:
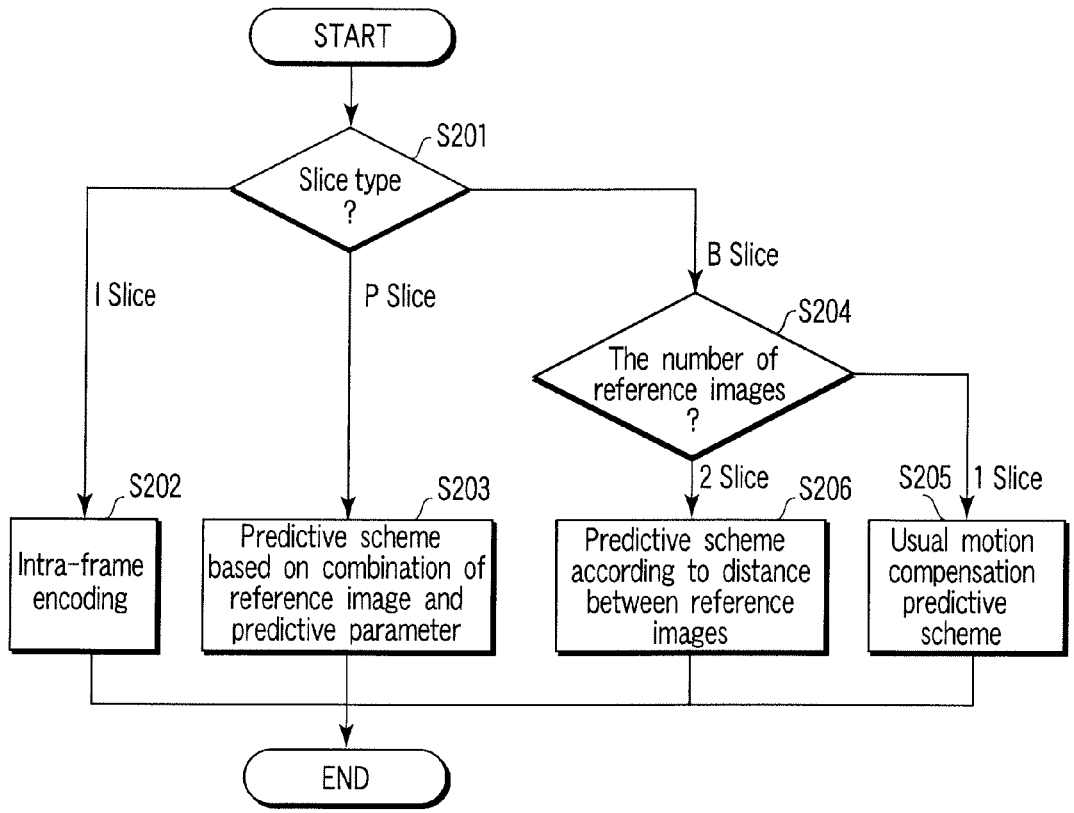
FIG. 14 is a flowchart showing a procedure to change a predictive scheme according to a kind of to-be-encoded region relative to an embodiment of the present invention.

A predictive image generating procedure using a method of changing a predictive image generating method according to a difference of the predictive type as well as the number of reference images is described with reference to FIG. 14. In this example, a method of generating a predictive image is changed in units of slice.

A predictive type (referred to a slice type) of a to-be-encoded slice which is a to-be-encoded region is determined, and it is divided into three slices, that is, an I slice in which a to-be-encoded slice is subjected to an intraframe encoding (intraframe prediction), a P slice which is predicted using a single reference image (one way prediction), and a B slice which is predicted using maximum two reference images (bidirectional prediction) (step S201).

If the to-be-encoded slice is an I slice as a result of determination of step S201, the intraframe encoding (intraframe encoding) is done (step S202). If the to-be-encoded slice is a P slice, a predictive scheme based on combination of one reference image and a predictive parameter as described above is adopted (step S203).

If the to-be-encoded slice a B slice, the number of reference images is checked (step S204), and the predictive scheme is changed according to the result. In other words, if the to-be-encoded slice is a B slice, and the reference image is single, normal motion compensative prediction is adopted (step S205). If the to-be-encoded slice is a B slice, and two reference images are used, a predictive scheme corresponding to an image-to-image distance of the two reference images is adopted (step S206).

Second Embodiment

There will be explained a second embodiment of the present invention. The entire configuration of the video encoding apparatus and the video decoding apparatus in the present embodiment is approximately similar to that of the first embodiment. Accordingly, only a difference with respect to the first embodiment is described. The present embodiment shows an example when the first embodiment is combined with other scheme.

The following equation (21) is a predictive equation of a bidirectional prediction of so-called B picture using two reference images, and a first method of averaging the motion compensative predictive image of two reference images simply.

$$P=(R(i)+R(j)+1)>>1 \tag{21}$$

In the first method, change information (change flag) for changing between a predictive equation shown by either of equations (4) to (6), equations (7) to (8), equation (9) or equations (10) to (20) and a predictive equation shown by an equation (21) are encoded along with the encoded data in a predetermined encoding unit such as a picture, a frame, a field and a slice, and transmitted from a video encoding apparatus to a decoding apparatus to be shared with both apparatuses. In other words, a predictive equation shown in either of the equations (4) to (6), equations (7) and (8), equation (10) or equations (10) to (20) and a predictive equation shown by the equation (21) are changed as needed.

According to the first method, a weighted mean depending on an image-to-image distance and a simple average of the reference images can be adoptively changed, whereby the improvement of a predictive efficient can be expected. Because the equation (21) includes no multiplication, an computational amount is not increased.

The equations (22) to (27) and equations (28) to (33) show a method of generating a predictive parameter for two reference images using a predictive parameter when the reference image is single. The present embodiment shows an example which these methods are combined with the first embodiment. At first, the equations (22) to (27) show a second method of obtaining a predictive value by averaging the value of the predictive equation when the reference image is single.

$$P_Y(i)=(D_1(i) \times R_Y(i)+2^{L_Y-1})>>L_Y+D_2(i) \tag{22}$$

$$P_{Cb}(i)=(E_1(i) \times (R_{Cb}(i)-128)+2^{L_C-1})>>L_C+E_2(i)+128 \tag{23}$$

$$P_{Cr}(i)=(F(i)_1 \times (R_{Cr}(i)-128)+2^{L_C-1})>>L_C+F_2(i)+128 \tag{24}$$

$$Y=\text{clip}((P_Y(i)+P_Y(j)+1)>>1) \tag{25}$$

$$Cb=\text{clip}((P_{Cb}(i)+P_{Cb}(j)+1)>>1) \tag{26}$$

$$Cr=\text{clip}((P_{Cr}(i)+P_{Cr}(j)+1)>>1) \tag{27}$$

PY(i), PCb(i) and PCr(i) are results in the middle of a predictive value of luminance signal Y, color-difference signal Cb and color-difference signal Cr respectively.

In the second method, change information (change flag) for changing between a predictive equation shown by either of equations (4) to (6), equations (7) to (8), equation (9) or equations (10) to (20) and a predictive equation shown by equations (22) to (27) are encoded along with the encoded data in a predetermined encoding unit such as a picture, a frame, a field and a slice, and transmitted from a video encoding apparatus to a decoding apparatus to be shared with both apparatuses. As thus described, a predictive equation shown in either of the equations (4) to (6), equations (7) and (8), equation (9) or equations (10) to (20) and a predictive equation shown by the equations (22) to (27) are changed as needed.

According to the second method, a weighted mean depending on an image-to-image distance and a predictive image based on a linear prediction using two reference images simple can be adoptively changed, whereby the improvement of a predictive efficient can be expected. However, according to the predictive type shown in the equations (22) to (27), although the multiplication number per pixel is twice, there is the merit that the degrees of freedom of the predictive coefficient increases. Therefore, further improvement of the predictive efficiency can be expected.

Equations (28) to (33) show as another predictive equation an example of a linear predictive equation using two reference images generated using two predictive parameters in the case of a single reference image.

$$P_Y(i,j)=(D_1(i) \times R_Y(i)+D_1(j) \times R_Y(j)+2^{L_Y}) >> (L_Y+1)+(D_2(i)+D_2(j)+1) >> 1 \quad (28)$$

$$P_{Cb}(i,j)=(E_1(i) \times (R_{Cb}(i)-128)+E_1(j) \times (R_{Cb}(j)-128)+2^{L_C}) >> (L_C+1)+(E_2(i)+E_2(j)+1) >> 1+128 \quad (29)$$

$$P_{Cr}(i,j)=(F_1(i) \times (R_{Cr}(i)-128)+F_1(j) \times (R_{Cr}(j)-128)+2^{L_C}) >> (L_C+1)+(F_2(i)+F_2(j)+1) >> 1+128 \quad (30)$$

$$Y=\text{clip}(P_Y(i,j)) \quad (31)$$

$$Cb=\text{clip}(P_{Cb}(i,j)) \quad (32)$$

$$Cr=\text{clip}(P_{Cr}(i,j)) \quad (33)$$

In the third method, change information (change flag) for changing between a predictive equation shown by either of equations (4) to (6), equations (7) to (8), equation (9) or equations (10) to (20) and a predictive equation shown by equations (28) to (33) are encoded along with the encoded data in a predetermined encoding unit such as a picture, a frame, a field and a slice, and transmitted from a video encoding apparatus to a decoding apparatus to be shared with both apparatuses. As thus described, a predictive equation shown in either of the equations (4) to (6), equations (7) and (8), equation (9) or equations (10) to (20) and a predictive equation shown by the equations (28) to (33) are changed as needed.

According to the third method, a weighted mean depending on an image-to-image distance and a predictive image based on a linear prediction using two reference images can be adoptively changed, whereby the improvement of a predictive efficient can be expected. However, according to the predictive type shown in the equations (28) to (33), although the multiplication number per pixel is twice, there is the merit that the degrees of freedom of the predictive coefficient increases. Therefore, further improvement of the predictive efficiency can be expected.

The above embodiment is explained as an example of a video encoding/decoding system using orthogonal transformation in units of block. However, the method of the present invention described in the above embodiment can be adopted to a case with the use of another transformation technique such as wavelet transformation.

A process of video encoding and decoding concerning the present invention may be realized as a hardware (apparatus), and may be executed by a computer using software. A part of the process may be realized with a hardware, and the other thereof may be executed by software. Consequently, according to the present invention, there can be provided a program to make a computer execute a video encoding or a decoding process or a storage medium stored the program.

As discussed above, according to the current invention, a video encoding/decoding can perform with a high efficient and a little computational amount by doing an appropriate prediction for a video image whose luminance varies in terms of time such as a fading image and a dissolve image in particular.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A video decoding method for application to a to-be-decoded block of a to-be-decoded image, comprising:
    a first step of decoding encoded data of a to-be-decoded image to obtain a quantized orthogonal transform coefficient, motion vector information and index information;
    a second step of calculating a first distance between a first reference image indicated by the index information and the to-be-decoded image and a second distance between the first reference image and a second reference image indicated by the index information;
    a third step of calculating a first weighting factor for the first reference image and a second weighting factor for the second reference image based on a rate of the first distance to the second distance;
    a fourth step of generating a prediction image by calculating a linear sum of an image of a region specified by the motion vector information in the first reference image and an image of a region specified by the motion vector information in the second reference image according to the first weighting factor and the second weighting factor;
    a fifth step of calculating a prediction error by subjecting the quantized orthogonal transform coefficient information to dequantization and inverse orthogonal transform; and
    a sixth step performed by a playback unit of generating a playback video image signal by adding the prediction error and the prediction image,
    wherein the third step includes setting values of both of the first weighting factor and the second weighting factor to a value for average prediction when the second weighting factor is larger than an upper limit or when the second weighting factor is smaller than a lower limit.

2. A video decoding apparatus for decoding of a to-be-decoded block of a to-be-decoded image, comprising:
    a decoding unit to decode encoded data of a to-be-decoded image to obtain quantized orthogonal transform coefficient, motion vector information and index information;
    a distance calculation unit to calculate a first distance between a first reference image indicated by the index information and the to-be-decoded image and a second distance between the first reference image and a second reference image indicated by the index information;
    a weighting factor calculation unit to calculate a first weighting factor for the first reference image and a second weighting factor for the second reference image based on a rate of the first distance to the second distance;
    a prediction image generation unit to generate a prediction image by calculating a linear sum of an image of a region specified by the motion vector information in the first reference image and an image of a region specified by the motion vector information in the second reference image according to the first weighting factor and the second weighting factor;
    a prediction error calculation unit to calculate a prediction error by subjecting the quantized orthogonal transform coefficient information to dequantization and inverse orthogonal transform; and a playback unit to generate a playback image signal by adding the prediction error and the prediction image, wherein the weighting factor calculation unit includes a setting unit to set values of both of the first weighting factor and the second weighting factor to a value for average prediction when the second weighting factor is larger than an upper limit or when the second weighting factor is smaller than a lower limit.

* * * * *